United States Patent
Kouno et al.

(10) Patent No.: US 9,623,706 B2
(45) Date of Patent: Apr. 18, 2017

(54) TIRE WITH WELDED THERMOPLASTIC CONSTITUENT MEMBERS

(71) Applicant: BRIDGESTONE CORPORATION, Chuo-ku, Tokyo (JP)

(72) Inventors: Yoshihide Kouno, Kodaira (JP); Seiji Kon, Kodaira (JP); Keiichi Hasegawa, Kodaira (JP)

(73) Assignee: BRIDGESTONE CORPORATION, Chou-ku, Tokyo (JP)

( * ) Notice: Subject to any disclaimer, the term of this patent is extended or adjusted under 35 U.S.C. 154(b) by 314 days.

(21) Appl. No.: 14/344,846

(22) PCT Filed: Sep. 25, 2012

(86) PCT No.: PCT/JP2012/074569
§ 371 (c)(1),
(2) Date: Mar. 13, 2014

(87) PCT Pub. No.: WO2013/047525
PCT Pub. Date: Apr. 4, 2013

(65) Prior Publication Data
US 2014/0345778 A1    Nov. 27, 2014

(30) Foreign Application Priority Data
Sep. 26, 2011    (JP) .................................. 2011-209932

(51) Int. Cl.
*B60C 5/01*        (2006.01)
*B60C 5/18*        (2006.01)
(Continued)

(52) U.S. Cl.
CPC .......... *B60C 5/007* (2013.01); *B29D 30/0061* (2013.01); *B29D 30/0681* (2013.01);
(Continued)

(58) Field of Classification Search
CPC .. B60C 5/01; B60C 5/007; B60C 5/18; B29D 30/0678; B29D 30/0679; B29D 30/0681;
(Continued)

(56) References Cited

U.S. PATENT DOCUMENTS 3,888,291 A * 6/1975 Herzlich .................... 152/452 X
4,357,191 A * 11/1982 Bullard .................... 156/244.14
(Continued)

FOREIGN PATENT DOCUMENTS

EP    2399760 A1    12/2011
EP    2468532 A1    6/2012
(Continued)

OTHER PUBLICATIONS

Communication dated Apr. 29, 2015 from the European Patent Office in counterpart application No. 12836313.2.
(Continued)

*Primary Examiner* — Adrienne C Johnstone
(74) *Attorney, Agent, or Firm* — Sughrue Mion, PLLC

(57) ABSTRACT

It is ensured the strength of a welded section in a tire that is configured by welding tire constituent members formed of a thermoplastic material. A tire has a first welded portion, in which one section of one tire constituent member and one section of another tire constituent member are both melted and welded, and a second welded portion, which is formed by welding a welding-use thermoplastic material to the surface of the first welded portion, whereby the strength of the joint section is ensured.

6 Claims, 12 Drawing Sheets

(51) Int. Cl.
    B29D 30/00    (2006.01)
    B29D 30/06    (2006.01)
    B29D 30/08    (2006.01)
    B60C 5/00     (2006.01)
    B29D 30/70    (2006.01)
    B60C 1/00     (2006.01)
    B29D 30/16    (2006.01)
    B29D 30/30    (2006.01)

(52) U.S. Cl.
    CPC ......... B29D 30/08 (2013.01); B29D 30/1607 (2013.01); B29D 30/3007 (2013.01); B29D 30/70 (2013.01); B60C 1/00 (2013.01); B60C 5/01 (2013.01); B60C 5/18 (2013.01); B29D 2030/086 (2013.01); B29D 2030/1678 (2013.01)

(58) Field of Classification Search
    CPC .... B29D 30/08; B29D 30/0061; B29D 30/06; B29D 2030/084; B29D 2030/086
    USPC .......... 152/452, 343.1–345.1; 156/125, 134, 156/157, 304.2, 304.3, 123, 110.1
    See application file for complete search history.

(56) References Cited

U.S. PATENT DOCUMENTS

| | | | | |
|---|---|---|---|---|
| 4,950,151 A | * | 8/1990 | Zachariades | 156/244.11 |
| 5,015,315 A | * | 5/1991 | Nakasaki | 152/452 |
| 5,985,079 A | * | 11/1999 | Ellison | 156/244.23 |
| 2011/0297290 A1 | * | 12/2011 | Kouno | B60C 5/007 |
| 2012/0145301 A1 | * | 6/2012 | Kouno | B60C 5/01 |

FOREIGN PATENT DOCUMENTS

| | | |
|---|---|---|
| JP | 35-007572 B1 | 6/1960 |
| JP | 52-093487 A | 8/1977 |
| JP | 03-143701 A | 6/1991 |
| JP | 2011-042235 A | 3/2011 |
| JP | 2011042090 A * | 3/2011 |
| JP | 2011-183650 A | 9/2011 |
| JP | 2011207166 A | 10/2011 |
| WO | 2010/095655 A1 | 8/2010 |
| WO | 2011/021703 A1 | 2/2011 |

OTHER PUBLICATIONS

Communication dated Nov. 4, 2014, issued by the Japan Patent Office in corresponding Japanese Application No. 2011-209932.
International Search Report, PCT/JP2012/074569, dated Oct. 23, 2012.
Otto Schwarz et al., "Kunststoffverarbeitung", Jan. 1, 1985 (Jan. 1, 1985), pp. 193-199.
European Office Action corresponding to European Patent Application No. 12 836 313.2-1706, dated Dec. 22, 2016.

* cited by examiner

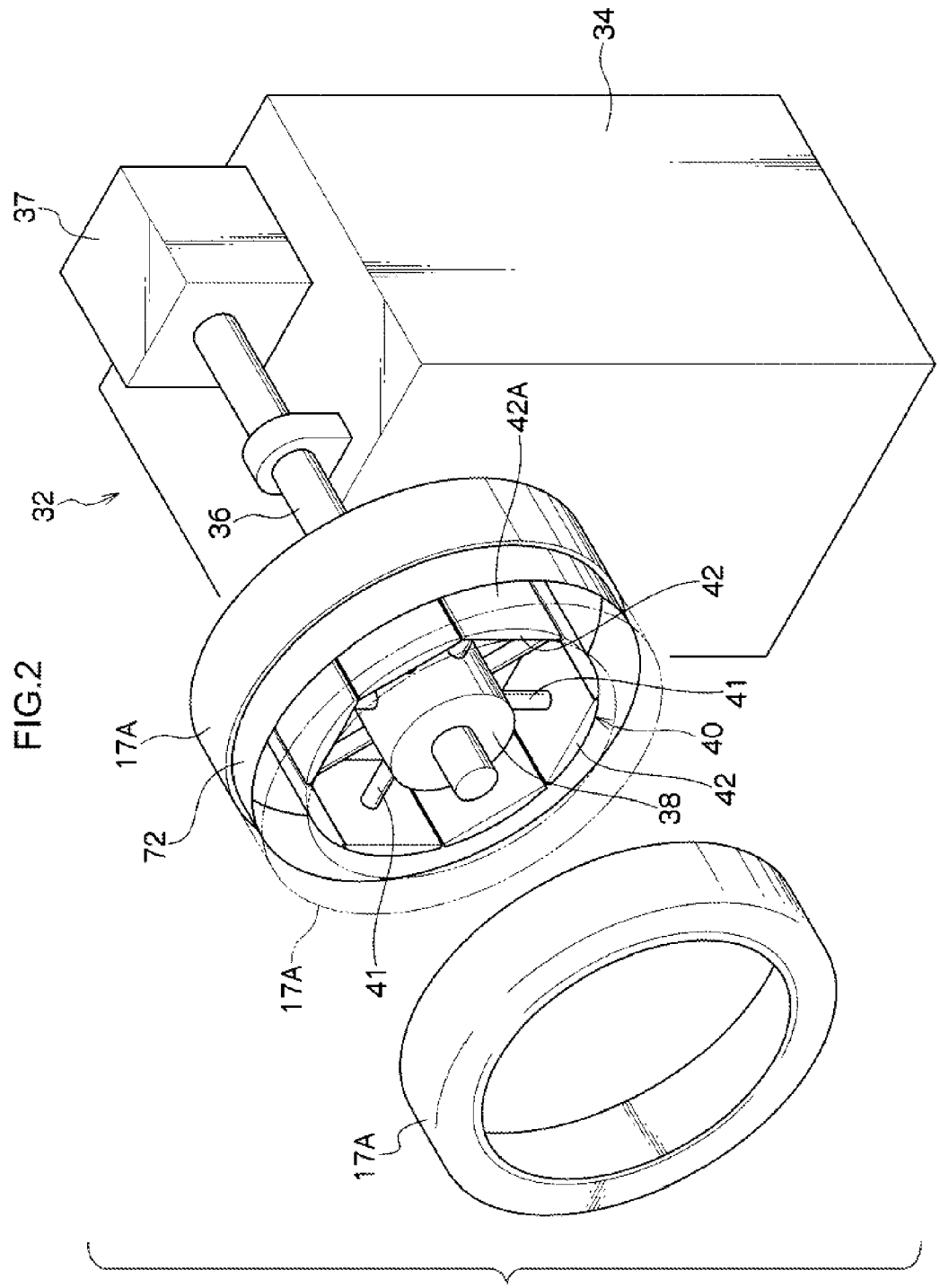

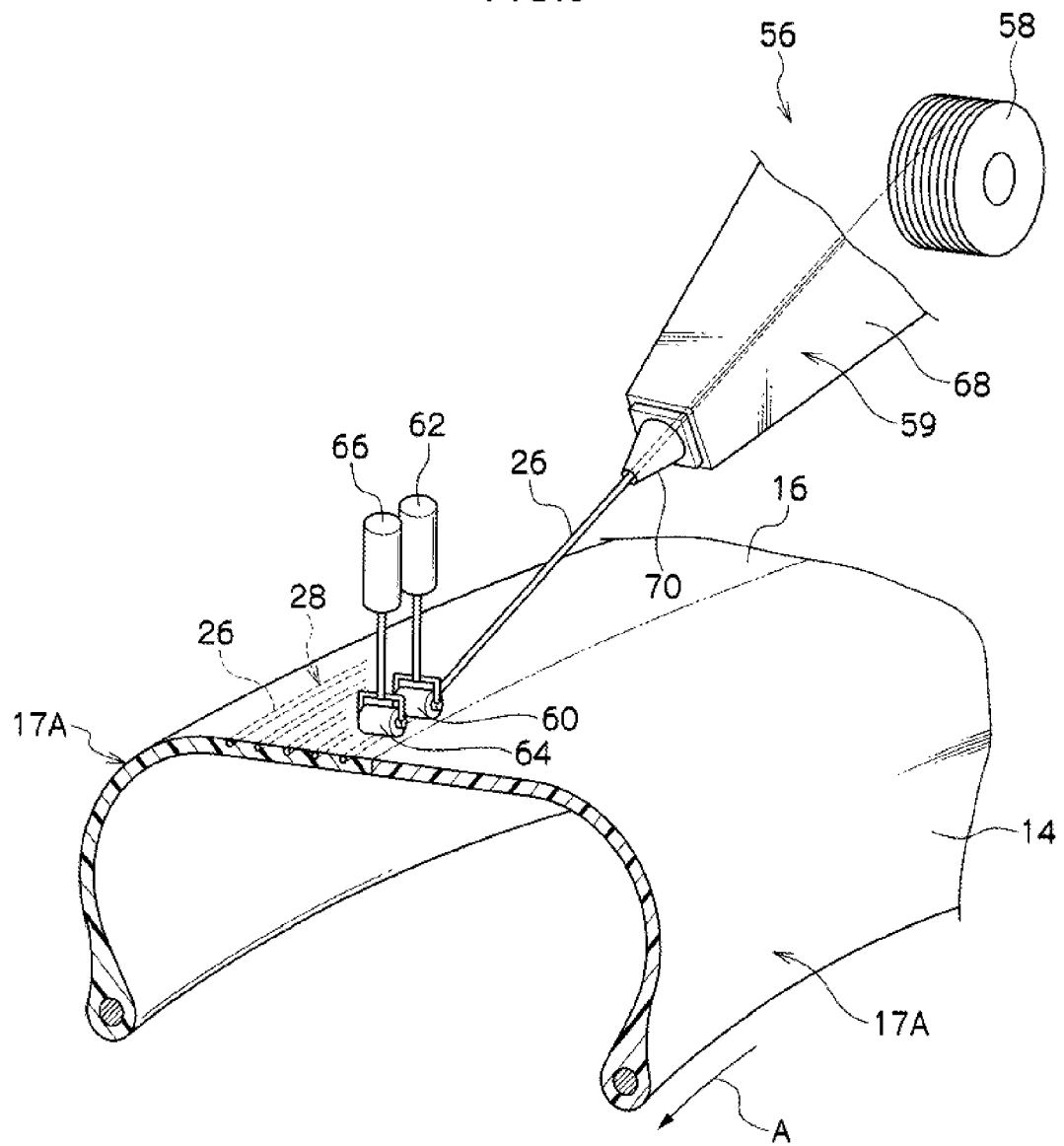

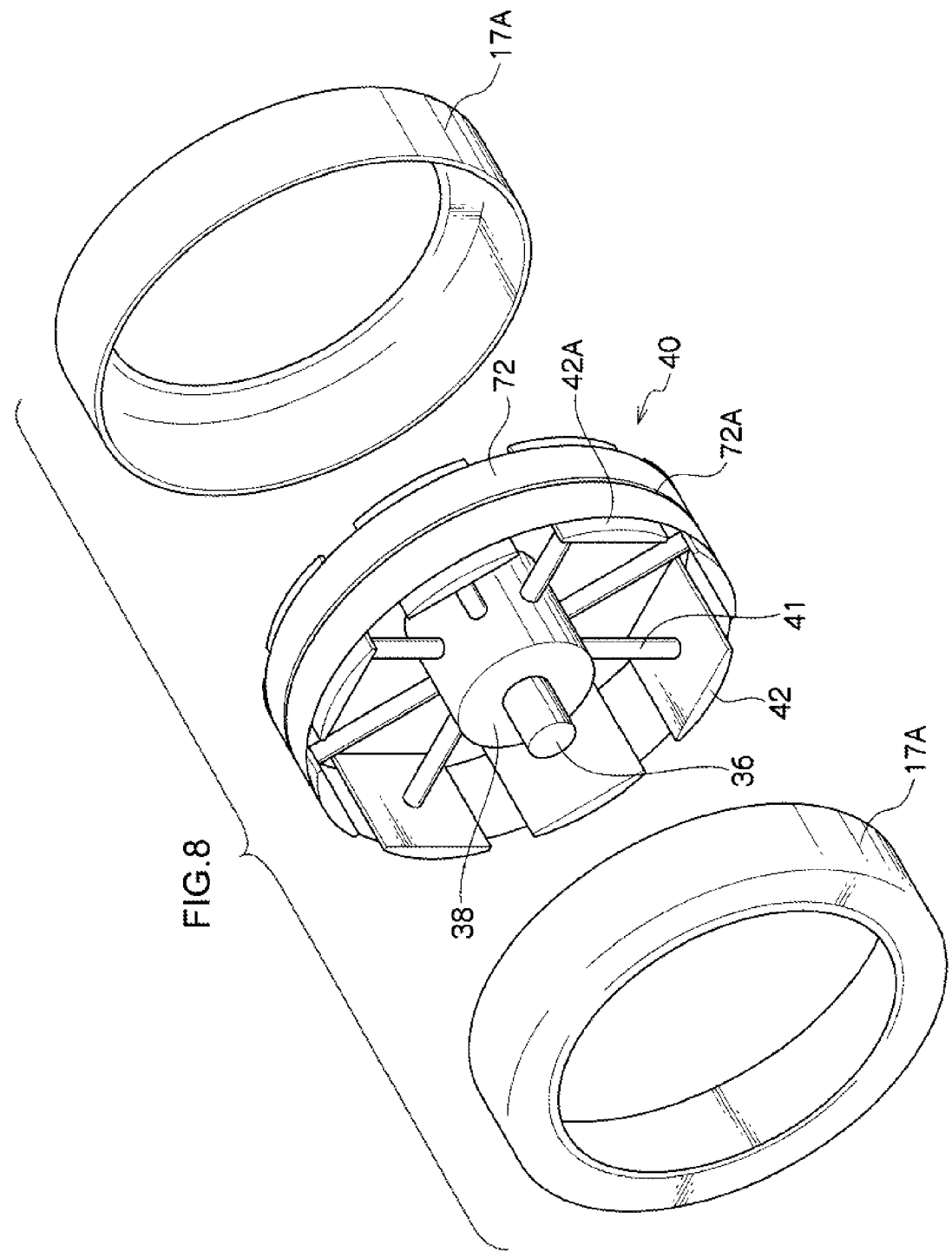

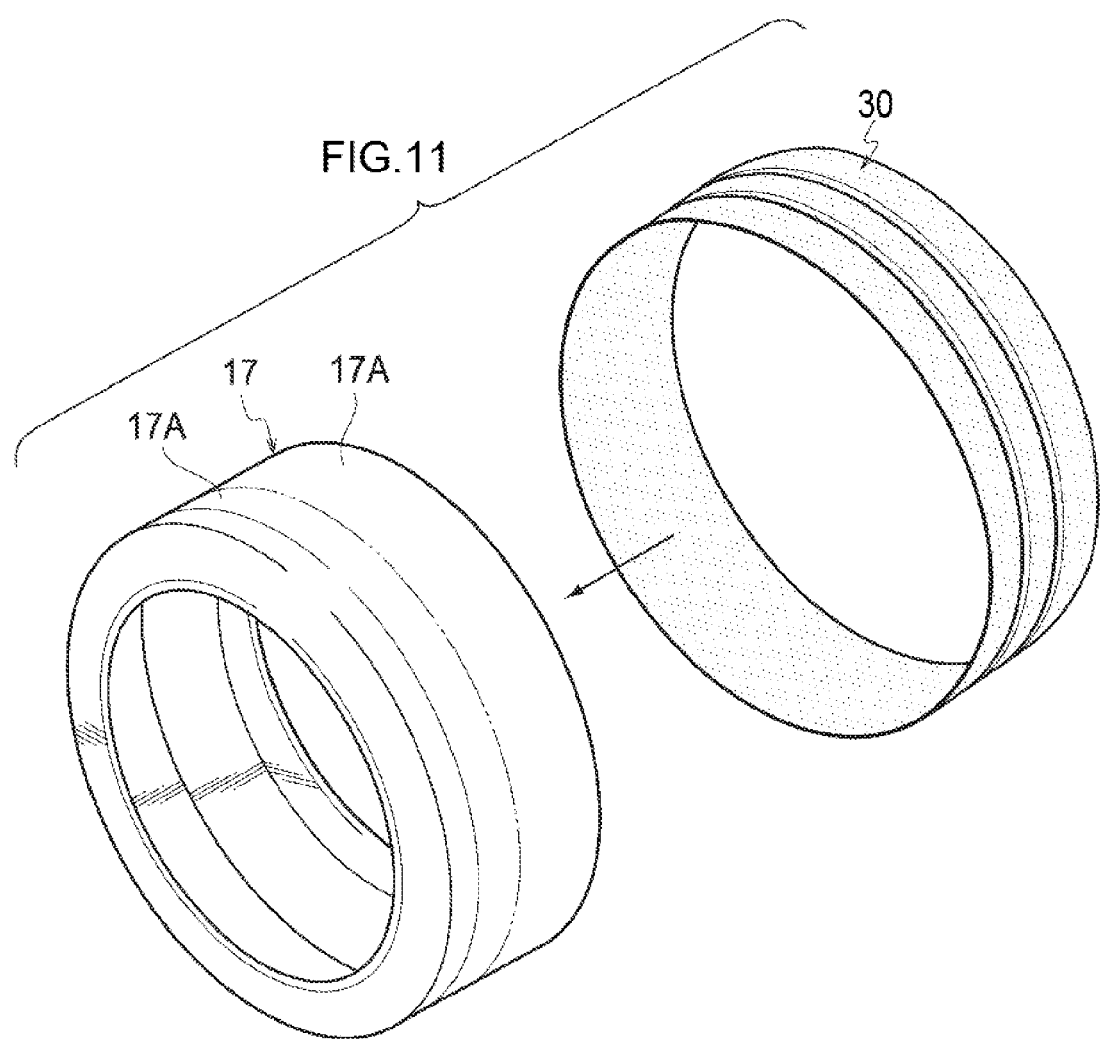

TIRE WITH WELDED THERMOPLASTIC CONSTITUENT MEMBERS

CROSS REFERENCE TO RELATED APPLICATIONS

This application is a National Stage of International Application No. PCT/JP2012/074569filed Sep. 25, 2012, claiming priority based on Japanese Patent Application No. 2011-209932filed Sep. 26, 2011.

TECHNICAL FIELD

The present invention pertains to a tire mounted on a rim and particularly relates to a tire at least part of which is formed of a thermoplastic material.

BACKGROUND ART

Conventionally, pneumatic tires configured from rubber, organic fiber material, and steel members have been used on vehicles such as passenger vehicles.

However, used rubber has limited recycling applications and has been disposed of, for example, by incinerating it for thermal recycling or shredding it to use as a paving material for roadways.

In recent years, there has been a demand to use thermoplastic resins and thermoplastic elastomers as tire materials from the standpoint of weight reduction and recycling ease.

For example, patent document 1 discloses a pneumatic tire that is formed using a thermoplastic polymer material.

CITATION LIST

Patent Literature

Patent Document 1: Japanese Patent Application Laid-Open (JP-A) No. 03-143701

SUMMARY OF INVENTION

Technical Problem

Tires using thermoplastic polymer materials are easier and cheaper to manufacture than conventional tires made of rubber.

Incidentally, when using a mold to form a tire, if the tire inner cavity is formed using a core, there is the problem that the core becomes unable to be removed from the formed tire. For this reason, in patent document 1, annular tire halves obtained by dividing a tire in its axial direction are formed, and then the two tire halves are joined to one another to obtain a pneumatic tire.

Additionally, the joining of the tire halves is performed by using the mold itself or a high-frequency heater, for example, to heat the area around the joint section of the one tire half and the other tire half to thereby melt and cause the thermoplastic polymer material configuring the tire halves to flow.

However, when the mold is used to reheat and melt the formed tire halves, the joint section is exposed to heat for a long period of time and sometimes the material strength of the section that has melted and solidified becomes lower than that of other sections, so there is room for improvement.

The present invention has been made in order to solve the above problem, and it is an object thereof to provide a tire in which the strength of the joint section is ensured.

Solution to Problem

A tire pertaining to a first aspect includes: one tire constituent member and another tire constituent member that are formed of a thermoplastic material; a first welded portion in which one section of the one tire constituent member and one section of the other tire constituent member are both melted and welded; and a second welded portion formed by welding a welding-use thermoplastic material to the surface of the first welded portion.

In the tire pertaining to the first aspect, the one section of the one tire constituent member and the one section of the other tire constituent member both melt and are welded at the first welded portion, and the second welded portion is formed as a result of the welding-use thermoplastic material being welded to the surface of the first welded portion.

The first welded portion is formed by melting and welding the tire constituent members themselves, and the second welded portion is formed by supplying the separate welding-use thermoplastic material to the first welding portion and performing welding, so the strength of the joint section can be improved in comparison to just a case where the tire constituent members themselves are melted and welded or just a case where the tire constituent members themselves are not melted but the separate welding-use thermoplastic material is supplied and welded to the tire constituent members.

Because of this, the one tire constituent member and the other tire constituent member are strongly welded.

A tire pertaining to a second aspect is the tire pertaining to the first aspect, wherein the welding-use thermoplastic material of the second welded portion is welded to both the one section of the one tire constituent member and the one section of the other tire constituent member at the first welded portion.

In the tire pertaining to the second aspect, the welding-use thermoplastic material of the second welded portion is welded to both the one section of the one tire constituent member and the one section of the other tire constituent member at the first welded portion, whereby the strength of the joint section of the tire constituent members can be improved.

A tire pertaining to a third aspect is the tire pertaining to the first aspect or the second aspect, wherein the first welded portion is disposed on a tire inner surface side configured by the one tire constituent member and the other tire constituent member, and the second welded portion is disposed on a tire outer surface side.

In the tire pertaining to the third aspect, the second welded portion is disposed on the tire outer surface side, so the work of welding the welding-use thermoplastic material to the tire constituent members becomes easier in comparison to a case where the second welded portion is disposed on the tire inner surface side.

A tire pertaining to a fourth aspect is the tire pertaining to the third aspect, wherein the tire inner surface side of the first welded portion configured by the one tire constituent member and the other tire constituent member is convex, the tire outer surface side of the first welded portion is concave, and the second welded portion is configured as a result of the concave section of the first welded portion being filled with the welding-use thermoplastic material.

In the tire pertaining to the fourth aspect, the tire inner surface side of the first welded portion is convex and the tire outer surface side of the first welded portion is concave. Additionally, the second welded portion is configured as a result of the concave section of the first welded portion being filled with the welding-use thermoplastic material.

Because the concave section is filled with the welding-use thermoplastic material, the tire outer surface can be flattened.

By filling the concave section with the welding-use thermoplastic material and welding the thermoplastic material of the tire constituent members and the welding-use thermoplastic material, the area to which the welding-use thermoplastic material adheres can be enlarged in comparison to a case where the welding-use thermoplastic material is welded at a flat section, and the welding strength can be enhanced in comparison to a case where the welding-use thermoplastic material is welded at a flat section.

Moreover, because the first welded portion is convex on its tire inner surface side, the volume of the welded section increases in comparison to a case where the first welded potion is not convex on its tire inner surface side, and the welding strength can be raised.

A tire pertaining to a fifth aspect is the tire of any one of the first aspect to the fourth aspect, wherein the one tire constituent member configures one side of the tire across the tire equatorial plane, the other tire constituent member configures the other side of the tire across the tire equatorial plane, and the first welded portion and the second welded portion are disposed on the tire equatorial plane.

In the tire pertaining to the fifth aspect, the one tire constituent member configures one side of the tire across the tire equatorial plane, the other tire constituent member configures the other side of the tire across the tire equatorial plane, and the first welded portion and the second welded portion are disposed on the tire equatorial plane, whereby the tire can be given a bilaterally symmetrical structure.

A tire pertaining to a sixth aspect is the tire pertaining to the fifth aspect, wherein the first welded portion and the second welded portion have bilaterally symmetrical shapes across the tire equatorial plane.

By making the shapes of the first welded portion and the second welded portion bilaterally symmetrical shapes across the tire equatorial plane, the weight of the tire can be balanced between the right and left sides.

A tire pertaining to a seventh aspect is the tire of any one of the first aspect to the sixth aspect, wherein the thermoplastic material forming the one tire constituent member and the other tire constituent member and the welding-use thermoplastic material are the same type of thermoplastic material.

In the tire pertaining to the seventh aspect, the thermoplastic material forming the one tire constituent member and the other tire constituent member and the welding-use thermoplastic material are the same type of thermoplastic material, so in the second welded portion, compatibility between the thermoplastic material of the tire constituent members and the welding-use thermoplastic material is excellently exhibited and a high welding strength can be obtained.

In the tire described above, it is preferred that the tire constituent members have, on their tire radial direction inner sides, bead portions that contact bead seats and rim flanges of a rim and that annular bead cores be embedded in the bead portions. By embedding the annular bead cores in the bead portions, which are places fitted to the rim, the tire can be strongly held with respect to the rim like a conventional pneumatic tire made of rubber.

In the tire described above, it is preferred that seal portions comprising a rubber whose sealability is superior to that of the thermoplastic material be disposed on the sections that contact the rim. By disposing, on the sections that contact the rim, the seal portions comprising a rubber whose sealability is superior to that of the thermoplastic material, the sealability (airtightness) between the tire and the rim improves. For this reason, leakage of the air inside the tire can be suppressed even more in comparison to a case where sealing is performed between the rim and the thermoplastic material. Furthermore, by disposing the seal portions, rim fitability also improves.

In the tire described above, it is preferred that a reinforcement layer formed by spirally winding a cord whose stiffness is higher than that of the thermoplastic material be disposed on the outer peripheral portion of the tire constituent members. By disposing, on the tire outer peripheral portion, the reinforcement layer formed by spirally winding a cord whose stiffness is higher than that of the thermoplastic material, the side of the tire that contacts the road surface is reinforced. This reinforcement layer has a role corresponding to that of a belt in a pneumatic tire made of rubber. Consequently, by disposing the reinforcement layer on the outer peripheral portion of the tire, the puncture resistance, fracture resistance, circumferential direction stiffness, and anti-creep effect of the tire improve in comparison to a case where the reinforcement layer is not disposed.

In the tire described above, it is preferred that a tread rubber layer comprising a rubber whose wear resistance is superior to that of the thermoplastic material be disposed on the tire constituent members on the section that contacts the road surface and that the tread rubber layer cover the first welded portion and the second welded portion. By disposing, on the section that contacts the road surface, the tread rubber layer comprising a rubber whose wear resistance is superior to that of the thermoplastic material, the wear resistance and fracture resistance of the tire improve in comparison to a case where the tread rubber layer is not disposed on the section that comes into contact with the road surface. Furthermore, the welded section is protected by the tread rubber layer.

Advantageous Effects of Invention

The tire pertaining to the first aspect is given the configuration described above, so it has the superior effect that it can ensure the strength of the joint section of the tire constituent members comprising the thermoplastic material.

The tire pertaining to the second aspect is given the configuration described above, so it has the superior effect that it can improve the strength of the joint section of the tire constituent members.

The tire pertaining to the third aspect is given the configuration described above, so it can make the work of welding the welding-use thermoplastic material to the tire constituent members easy.

The tire pertaining to the fourth aspect is given the configuration described above, so the volume of the welded section increases and the welding strength can be enhanced.

The tire pertaining to the fifth aspect is given the configuration described above, so the performance of the right and left sides of the tire can be made the same.

The tire pertaining to the sixth aspect is given the configuration described above, so the balance in the weight of the tire between the right and left sides becomes excellent.

The tire pertaining to the seventh aspect is given the configuration described above, so a high welding strength can be obtained.

BRIEF DESCRIPTION OF DRAWINGS

FIG. 2 is a perspective view of a forming machine;

FIG. 6 is a perspective view showing main portions of a cord feeding device;

FIG. 8 is a perspective view of the tire halves and the tire support portion that is supporting a tire inner surface support ring;

FIG. 11 is an exploded perspective view of a tire case and a tread rubber layer pertaining to another embodiment.

DESCRIPTION OF EMBODIMENT

Figure 1A:
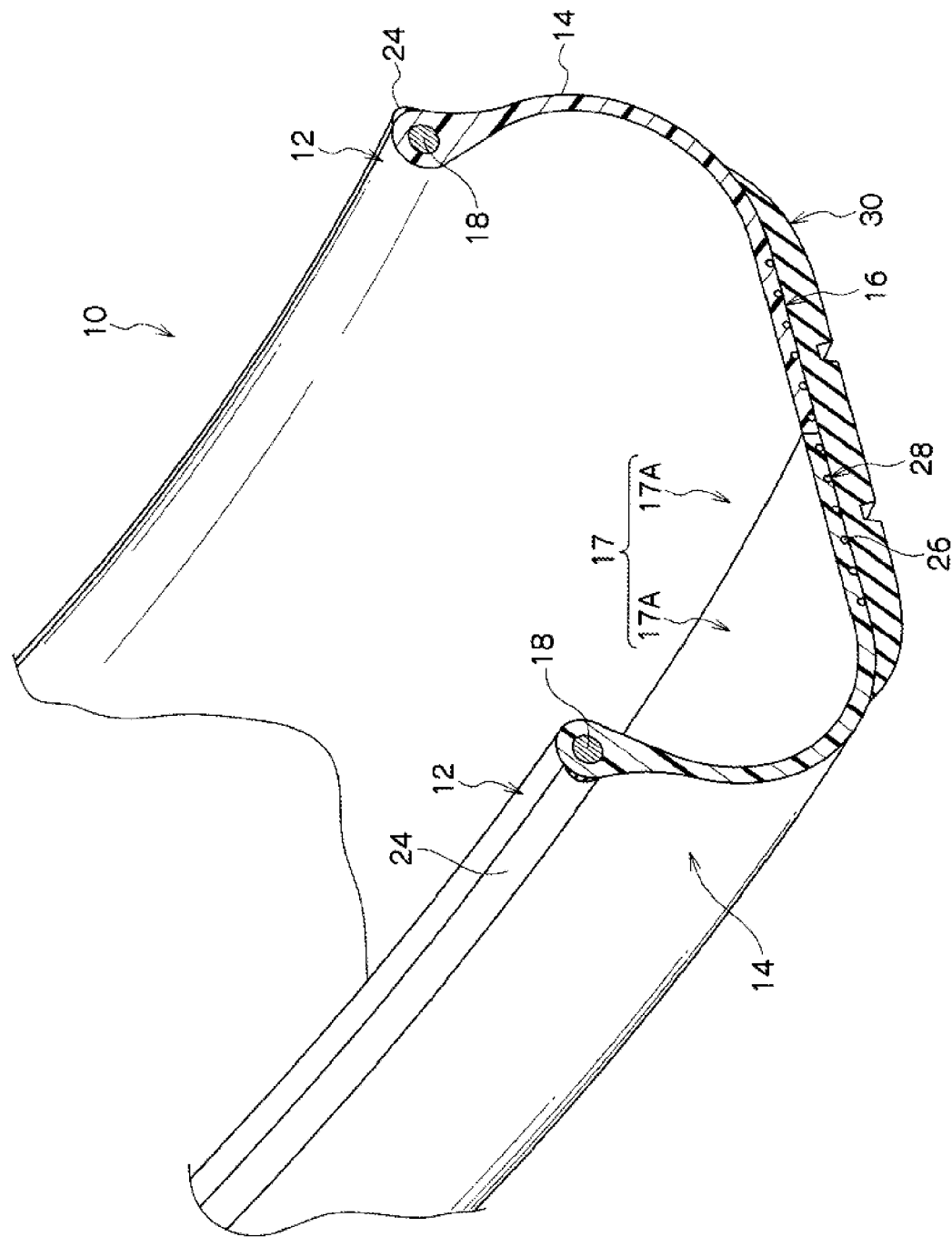
FIG. 1A is a perspective view in which part of a tire pertaining to an embodiment of the present invention has been sectioned.
Figure 1B:
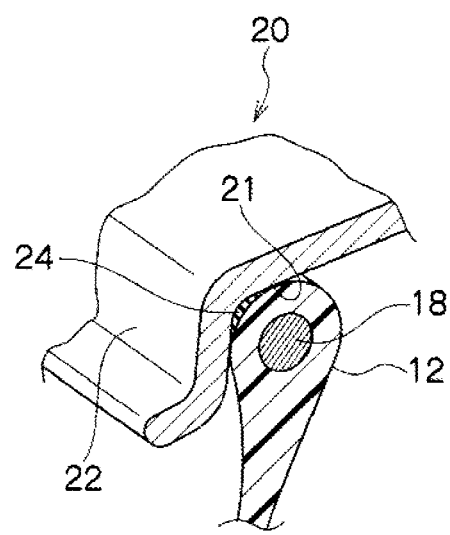
FIG. 1B is a cross-sectional view of a bead portion mounted on a rim.

A tire pertaining to an embodiment of a tire of the present invention will be described below in accordance with the drawings. As shown in FIG. 1, a tire 10 of the present embodiment has substantially the same cross-sectional shape as that of a conventionally common pneumatic tire made of rubber.

The tire 10 is equipped with a tire case (a tire skeletal member) 17 that comprises a pair of bead portions 12 that contact bead seat portions 21 and rim flanges 22 of a rim 20, side portions 14 that extend outward in the tire radial direction from the bead portions 12, and a crown portion 16 that interconnects the tire radial direction outside end of one side portion 14 and the tire radial direction outside end of the other side portion 14.

The tire case 17 of the present embodiment is formed of a first thermoplastic material.

The tire case 17 of the present embodiment is formed by disposing face to face, and joining at their tire equatorial plane sections, annular tire halves 17A serving as tire constituent members that have the same shape and are each obtained as a result of one bead portion 12, one side portion 14, and half of the crown portion 16 being integrally formed using a mold or the like, and an air chamber is formed between the tire case 17 and the rim. The tire case 17 is not limited to being formed by joining two members. For example, the tire case 17 may also be formed by joining three or more members, such as a first member in which one bead portion 12 and one side portion 14 are integrated, a second member corresponding to a tread portion (a tire outer peripheral portion), and a third member in which the other bead portion 12 and the other side portion 14 are integrated. Furthermore, the tire case 17 may also be formed by forming the pair of bead portions 12, the pair of side portions 14, and the crown portion 16 as a single body.

Furthermore, a reinforcement material (e.g., fibers, cords, nonwoven fabric, or woven fabric made of a polymer material or a metal) may also be embedded in the tire case 17 (e.g., in the bead portions 12, the side portions 14, and/or the crown portion 16) to thereby reinforce the tire case 17 with the reinforcement material.

As the first thermoplastic material, for example, a thermoplastic resin or a thermoplastic elastomer (TPE) can be used, but using a thermoplastic elastomer is preferred in consideration of elasticity requiring during travel and formability during manufacture.

Examples of thermoplastic elastomers include polyamide thermoplastic elastomers (TPA), copolyester thermoplastic elastomers (TPC), olefinic thermoplastic elastomers (TPO) styrenic thermoplastic elastomers (TPS), urethane thermoplastic elastomers (TPU), thermoplastic rubber vulcanizates (TPV), and unclassified thermoplastic elastomers (TPZ) as defined in JIS K6418. In particular, TPV, part of which consists of a rubber resin blended and mixed in, is preferred.

Furthermore, examples of thermoplastic resins include urethane resin, olefin resin, vinyl chloride resin, and polyamide resin.

As these thermoplastic materials, for example, materials whose deflection temperature under load (a load of 0.45 MPa) as defined in ISO 75-2 or ASTM D648 is equal to or greater than 78° C., whose tensile yield strength as defined in JIS K7113 is equal to or greater than 10 MPa, whose tensile yield elongation as also defined in JIS K7113 is equal to or greater than 10%, whose tensile elongation at break (JIS K7113) as also defined in JIS K7113 is equal to or greater than 50%, and whose Vicat softening temperature (method A) as defined in JIS K7206 is equal to or greater than 130° C. can be used.

The tire halves 17A comprising the first thermoplastic material can be formed, for example, by vacuum forming, pressure forming, injection molding, or melt casting, and thus the manufacturing process can be significantly simplified and the forming time is also shorter in comparison to a case where the tire halves comprise rubber and are formed (vulcanized).

Furthermore, in the present embodiment, the tire halves 17A have bilaterally symmetrical shapes—that is, the one tire half 17A and the other tire half 17A have the same shape—so there is the advantage that just one type of mold is needed to form the tire halves 17A.

Annular bead cores 18 comprising the same steel cords as in a conventional common pneumatic tire are embedded in the bead portions 12 of the present embedment, but the bead cores 18 may also be omitted provided that the stiffness of the bead portions 12 is ensured and there is no problem with the bead portions 12 fitting to the rim 20. The bead cores 18 may also be formed by cords or a material other than steel, such as organic fiber cords.

In the present embodiment, annular seal layers 24 comprising a rubber with superior sealability (airtightness) that is a softer material than the first thermoplastic material is formed on the sections of the bead portions 12 that contact the rim 20 and at least the sections that contact the rim flanges 22 of the rim 20. The seal layers 24 may also be formed on the sections that contact the bead seats. As the rubber forming the seal layers 24, using the same type of rubber as the rubber used on the outer surfaces of the bead portions of a conventional common pneumatic tire made of rubber is preferred. The rubber seal layers 24 may also be omitted provided that sealability (airtightness) between the bead portions 12 and the rim 20 can be ensured with just thermoplastic resin, and a different type of thermoplastic resin whose sealability (airtightness) is superior to that of the first thermoplastic material forming the side portions 14 may also be used.

A crown portion reinforcement layer 28 comprising a spirally wound steel reinforcement cord 26 is embedded in the crown portion 16. The reinforcement cord 26 may be entirely embedded in the crown portion 16 or may be partially embedded in the crown portion 16. The crown portion reinforcement layer 28 corresponds to a belt disposed on the outer peripheral surface of a carcass of a conventional pneumatic tire made of rubber.

The reinforcement cord 26 can also be coated with a resin material, and the crown portion reinforcement layer 28 can also be formed by winding the reinforcement cord 26 coated with the resin material around the crown portion 16. In this case, the resin material coating the reinforcement cord 26 is joined by welding or adhesion to the crown portion 16 at the places where it contacts the crown portion 16.

The embedded amount of the reinforcement cord 26 is preferably equal to or greater than ⅕ of the diameter of the reinforcement cord 26 and more preferably exceeds ½. Additionally, it is most preferred that the reinforcement cord 26 be entirely embedded in the crown portion 16. When the embedded amount of the reinforcement cord 26 exceeds ½ of the diameter of the reinforcement cord 26, it becomes difficult dimensionally for the reinforcement cord 26 to pop out from the surface. Furthermore, when the reinforcement cord 26 is entirely embedded in the crown portion 16, the surface of the crown portion 16 becomes flat, making it less likely for air to become trapped when another member is placed on top.

A tread rubber layer 30 comprising a rubber whose wear resistance is superior to that of the first thermoplastic material forming the side portions 14 is disposed on the outer peripheral side of the crown portion reinforcement layer 28. As the rubber used for the tread rubber layer 30, using the same type of rubber as the rubber used in a conventional pneumatic tire made or rubber is preferred. A tread layer comprising a different type of thermoplastic material and whose wear resistance is superior to that of the first thermoplastic material forming the side portions 14 may also be disposed on the outer peripheral portion.

(Tire Manufacturing Apparatus)

Next, an apparatus for manufacturing the tire 10 of the present embodiment will be described.

In FIG. 2, the main portions of a forming machine 32 used when forming the tire 10 are shown in a perspective view. The forming machine 32 has a base 34 grounded to a floor, and attached to the upper portion of the base 34 is a geared motor 37 that causes a horizontally disposed shaft 36 to rotate.

A tire support portion 40 is disposed on the end portion side of the shaft 36. The tire support portion 40 is equipped with a cylinder block 38 fixed to the shaft 36, and plural cylinder rods 41 extending outward in the radial direction are disposed at equidistant intervals in the circumferential direction on the cylinder block 38.

Tire support pieces 42 having circular arc curved surfaces 42A whose outer surfaces are set to be substantially the same as the radius of curvature of the tire inner surface are disposed on the distal ends of the cylinder rods 41.

Figure 3A:
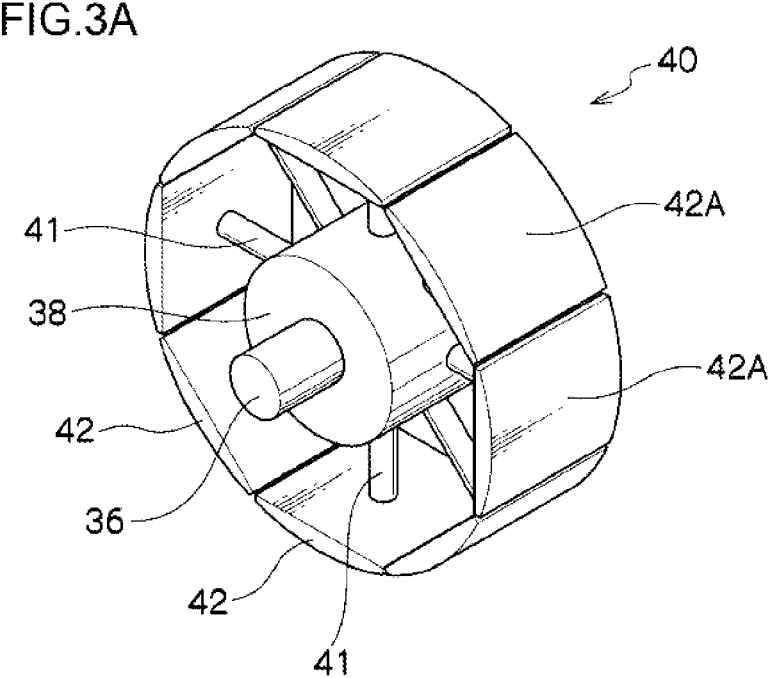
FIG. 3A is a perspective view of a tire support portion set to a minimum diameter.
Figure 3B:
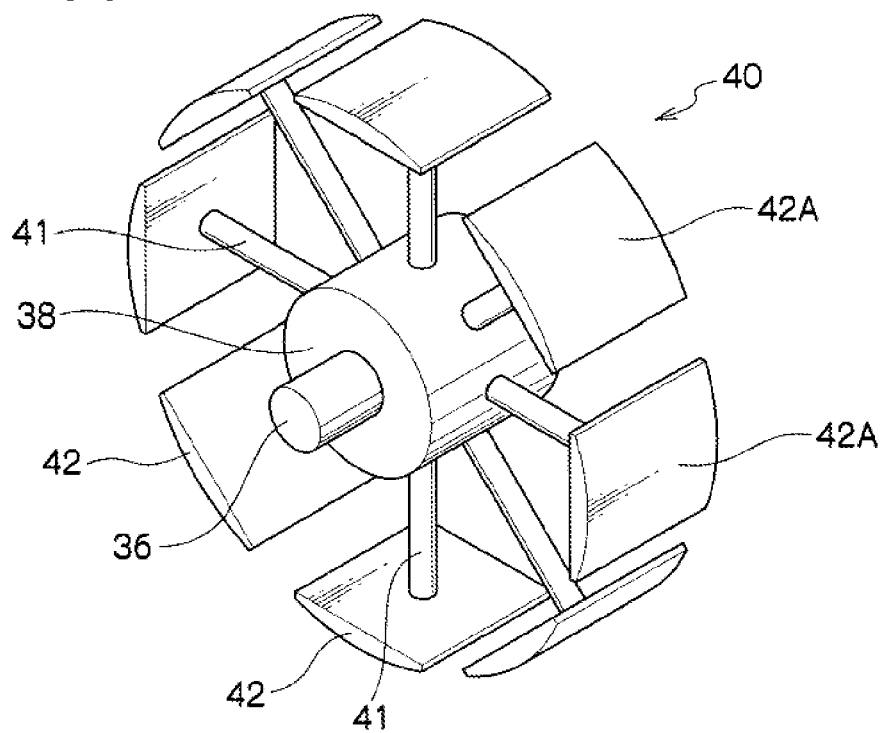
FIG. 3B is a perspective view of a tire support portion set to a maximum diameter.

FIG. 2 and FIG. 3A show a state in which the amount of projection of the cylinder rods 41 is smallest (a state in which the tire support portion 40 is set to a minimum diameter), and FIG. 3B shows a state in which the amount of projection of the cylinder rods 41 is largest (a state in which the tire support portion 40 is set to a maximum diameter).

The cylinder rods 41 can be moved the same amount in the same direction in conjunction with one another.

Figure 4:
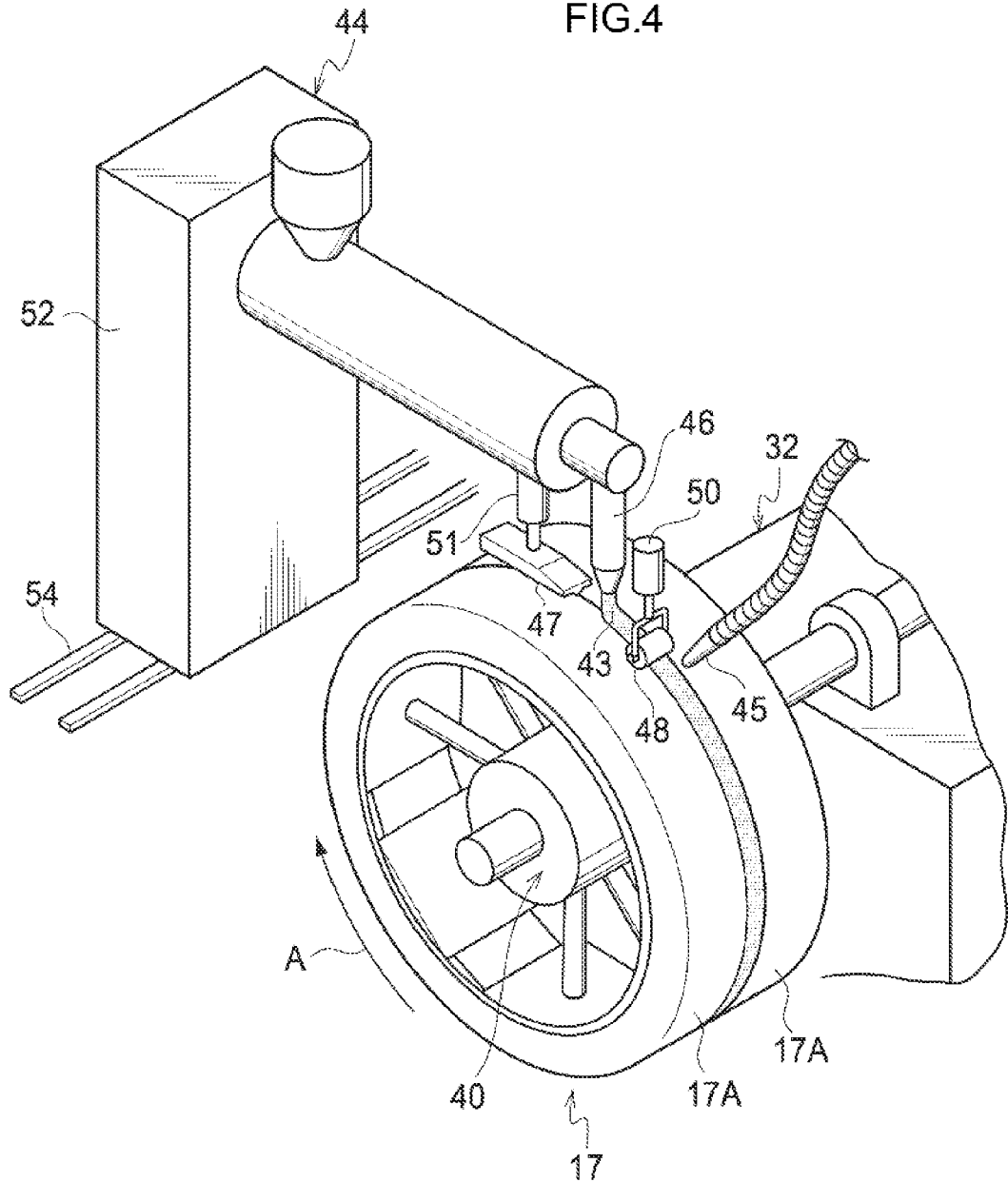
FIG. 4 is a perspective view of the forming machine and an extruding machine.

As shown in FIG. 4, an extruding machine 44 that extrudes a welding-use thermoplastic material 43 is disposed in the neighborhood of the forming machine 32. The extruding machine 44 is equipped with a resin jetting nozzle 46 that jets the molten welding-use thermoplastic material 43 downward.

It is preferred that the welding-use thermoplastic material 43 be the same type of thermoplastic material as the first thermoplastic material configuring the tire case 17, but the welding-use thermoplastic material 43 may also be of a different type provided that it can be welded. By using the same type of material for the welding-use thermoplastic material 43 and the first thermoplastic material, the welding strength between the welding-use thermoplastic material 43 and the first thermoplastic material becomes higher. Furthermore, by using the same type of material for the welding-use thermoplastic material 43 and the first thermoplastic material, the tire case 17 can be configured by one type of thermoplastic material overall, so the tire case 17 becomes inexpensive. Furthermore, by using different types of materials, materials having characteristics preferred for each of the first thermoplastic material for the tire skeletal member and the welding-use thermoplastic material 43 for joining can be used.

Furthermore, it is preferred that the welding-use thermoplastic material 43 have a Young's modulus in the range of 0.1 to 10 times that of the first thermoplastic material. When the welding-use thermoplastic material 43 has a Young's modulus equal to or less than 10 times that of the first thermoplastic material, there is no problem fitting the tire to the rim, but when the welding-use thermoplastic material 43 has a Young's modulus exceeding 10 times that of the first thermoplastic material, the tire crown portion becomes too hard and there is the potential for the welded section to crack when the tire is forcibly fitted on the rim. When the welding-use thermoplastic material 43 has a Young's modulus less than 0.1 times that of the first thermoplastic material, the welding-use thermoplastic material 43 becomes too soft and there is the potential for just the center portion to end up extending in the tire width direction because of tension in the tire width direction arising in the tire when the tire is inflated to its normal internal pressure and for the tire 10 to deform.

A leveling roller 48 that presses against the welding-use thermoplastic material 43 adhering to the tire outer surface and a cylinder device 50 that moves the leveling roller 48 up and down are disposed in the neighborhood of the resin jetting nozzle 46 on the downstream side thereof in the rotational direction of the tire case 17 (on the side in the direction of arrow A). The cylinder device 50 is supported on a strut 52 of the extruding machine 44 via a non-illustrated frame.

The leveling roller 48 of the present embodiment has cooling water circulating inside the roller and is water-cooled by the cooling water. In order to water-cool the leveling roller 48, it suffices to give the interior and the shaft of the leveling roller 48 a hollow structure, connect tubes to both ends of the shaft via rotary joints, supply the cooling water to the interior of the roller from the side of one rotary joint, and discharge the used cooling water from the side of the other rotary joint.

A cooling air blowing nozzle 45 that blows air for cooling is disposed on the downstream side of the leveling roller 48 in the rotational direction of the tire skeletal member.

Furthermore, a hot iron 47 is disposed on the side of the resin jetting nozzle 46 in the direction opposite to the rotational direction of the tire case (on the side in the direction opposite to the direction of arrow A).

Figure 5A:
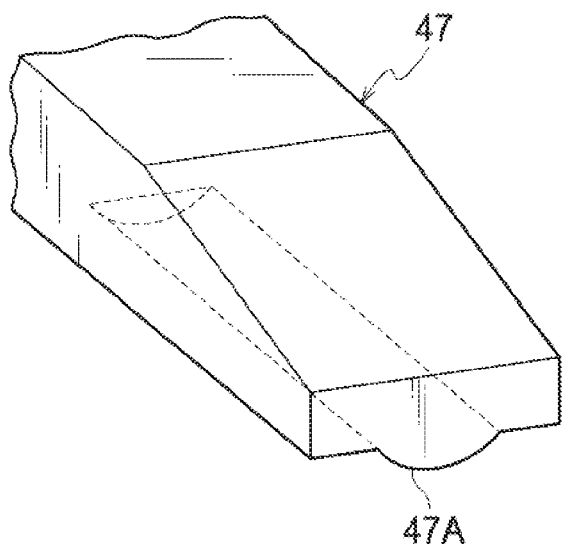
FIG. 5A is a perspective view of a hot iron.
Figure 5B:
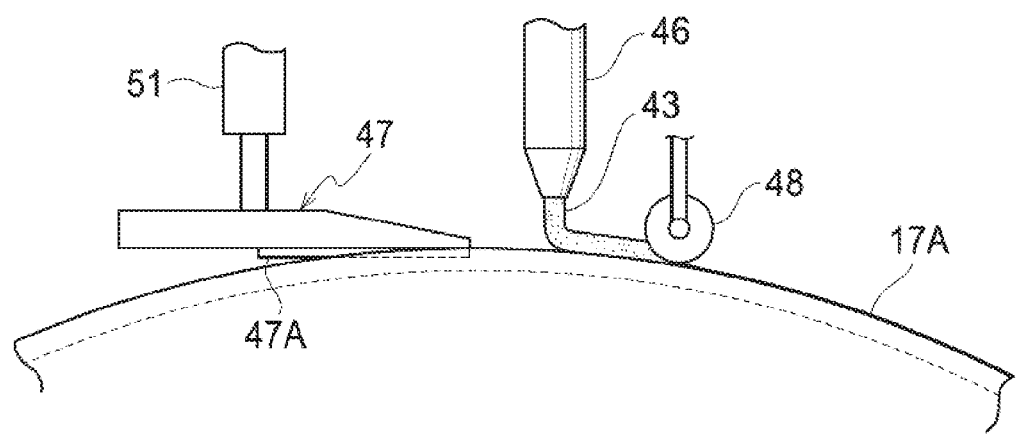
FIG. 5B is a side view of the hot iron, a resin jetting nozzle, and a leveling roller.

As shown in FIG. 5, the hot iron 47 is formed from a metal material and has a non-illustrated electric heater built inside. The hot iron 47 of the present embodiment has a tabular shape overall, and a rib 47A parallel to a tangential direction of the outer peripheral surface of the aforementioned drum 22 is formed on the undersurface of the hot iron 47. The hot iron 47 can heat to a temperature equal to or greater than the melting point of the thermoplastic material.

As shown in FIGS. 4 and 5, a cylinder device 51 that moves the hot iron 47 in the up and down direction is disposed above the hot iron 47. The cylinder device 51 is supported on the strut 52 of the extruding machine 44 via a non-illustrated frame.

The extruding machine 44 can move in a direction parallel to the shaft 36 of the forming machine 32 along guide rails 54 disposed on the floor.

A cord feeding device 56 equipped with a reel 58 and a cord heating device 59 such as shown in FIG. 6 is movably placed on the guide rails 54.

The cord feeding device 56 is equipped with the reel 58 that has the reinforcement cord 26 wound around it, the cord heating device 59 that is disposed on the downstream side of the reel 58 in the cord conveyance direction, a first roller 60 that is disposed on the downstream side in the conveyance direction of the reinforcement cord 26, a first cylinder device 62 that moves the first roller 60 in directions toward and away from the tire outer peripheral surface, a second roller 64 that is disposed on the downstream side of the first roller 60 in the conveyance direction of the reinforcement cord 26, and a second cylinder device 66 that moves the second roller 64 in directions toward and away from the tire outer peripheral surface. It suffices for the cord feeding device 56 to be disposed with either one of the first roller 60 and the second roller 64.

Furthermore, the cord heading device 59 is equipped with a non-illustrated heater and fan that generate hot air, a heating box 68 into whose interior the hot air is supplied and through whose inside space the reinforcement cord 26 passes, and a dispensing unit 70 that dispenses the heated reinforcement cord 26.

(Tire Manufacturing Method)

(1) As shown in FIG. 2, first, the two tire halves 17A are disposed face to face on the outer peripheral side of the tire support portion 40 set to a reduced diameter, and a tubular tire inner surface support ring 72 comprising a thin metal plate (e.g., a steel plate having a thickness of 0.5mm) is disposed inside the two tire halves 17A (in FIG. 2, one of the tire halves 17A is shown detached in order to show the inside).

Figure 7:
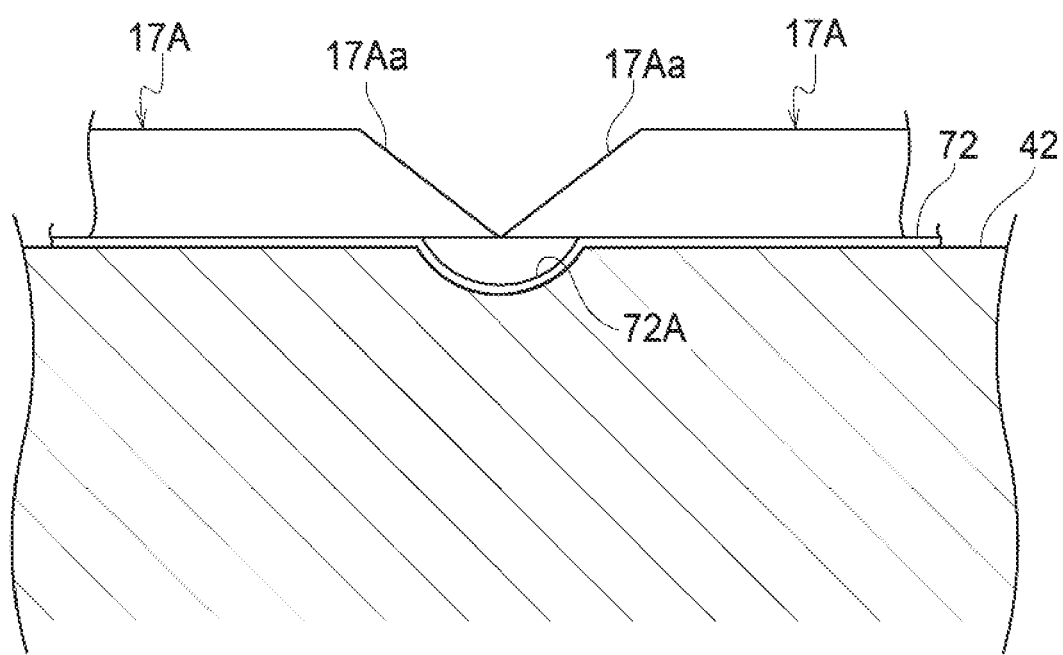
FIG. 7 is an enlarged cross-sectional view of a joint section of tire halves.

As shown in the cross-sectional view of FIG. 7, the tire halves 17A of the present embodiment have tapered shapes on the tire equatorial plane CL side. The tire halves 17A of the present embodiment have flat (parallel to the rotational axis of the tire) inner peripheral surfaces on the tire equatorial plane side, and outside sloping surfaces 17Aa that slope in the direction in which the tire diameter becomes smaller heading toward the end portions on the tire equatorial plane CL side are formed on the outer peripheral surfaces of the tire halves 17.

In the present embodiment, when the two tire halves 17A are disposed face to face, the end portion of the one tire half 17A and the end portion of the other tire half 17A are abutted against and brought into contact with one another, but a slight gap may also be left in between them.

The outer diameter of the tire inner surface support ring 72 is set to substantially the same dimension as the inner diameter of the outer peripheral sections of the tire halves 17A, so that the outer peripheral surface of the tire inner surface support ring 72 is in close contact with the inner peripheral surfaces of the outer peripheral sections of the tire halves 17A.

As shown in FIG. 7 and FIG. 8, an annular groove 72A that extends continuously along the circumferential direction in the width direction center portion of the tire inner surface support ring 72 is formed in the outer peripheral surface of the tire inner surface support ring 72. The annular groove 72A of the present embodiment has a substantially semicircular cross-sectional shape, but it may also have a cross-sectional shape other than a semicircular shape.

By disposing the tubular tire inner surface support ring 72 inside the two tire halves 17A, the inner surface side of the joint portion of the tire halves 17A is in close contact with the outer peripheral surface of the tire inner surface support ring 72, the occurrence of convexities and concavities (having the opposite shape of concavities and convexities mentioned hereafter) in the joint section (described later) caused by concavities and convexities in the tire circumferential direction that arise on the tire support portion outer periphery because of the gaps (concave portions) between the tire support pieces 42 of the tire support portion 40 can be suppressed, and concavities and convexities in the tire circumferential direction of the tire case 17 itself can also be suppressed.

Because the tire inner surface support ring 72 is formed of a thin metal plate, it can be bendingly deformed and easily inserted inside the tire halves 17A.

Additionally, as shown in FIG. 8, the diameter of the tire support portion 40 is expanded to bring the plural tire support pieces 42 into contact with the inner peripheral surface of the tire inner surface support ring 72, so that the tire inner surface support ring 72 is held from inside by the plural tire support pieces 42 (in FIG. 8, both of the tire halves 17A are shown detached in order to show the inside). In a case where the reverse side of the annular groove 72A has a convex shape on the inner peripheral surface of the tire inner surface support ring 72, grooves may also be formed in the outer peripheral surfaces of the tire support pieces 42 in order to escape this convex shape.

In the present embodiment, the tire inner surface support ring 72 is formed of a thin metal plate in order to allow it to be bendingly deformed, but the tire inner surface support ring 72 may also be formed of a hollow rigid body.

Because the two tire halves 17A are disposed face to face and supported in this way, the end portions of the tire halves 17A on the tire equatorial plane side can be precisely aligned with one another along the entire circumference.

(2) Next, the extruding machine 44 is moved so that, as shown in FIG. 4, the abutting section (the tire equatorial plane CL of the tire case 17) of the two tire halves 17A is disposed below the hot iron 47, the resin jetting nozzle 46, the leveling roller 48, and the cooling air blowing nozzle 45.

Figure 9A:
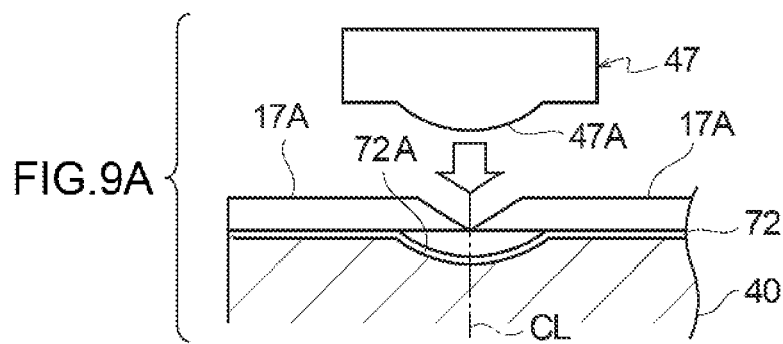
FIG. 9A is a cross-sectional view of the area around the joint section and shows a process for joining the tire halves.

(3) Next, the hot iron 47 and the leveling roller 48 are lowered. The hot iron 47 is lowered from the state shown in FIG. 9A and is pressed against the outer periphery of the abutting section of the two tire halves 17A as shown in FIG. 9B.

Figure 9B:
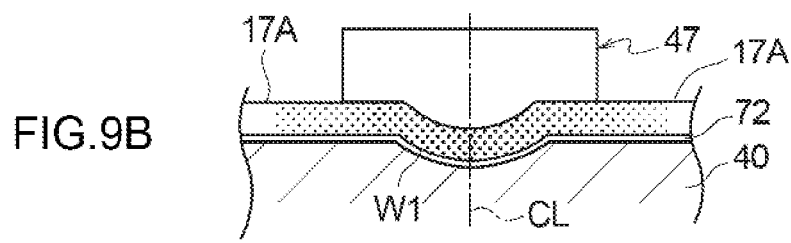
FIG. 9B is a cross-sectional view of the area around the joint section and shows the process for joining the tire halves.

(4) The section pressed by the hot iron 47—that is, the end portion of the one tire case 17 and the end portion of the other tire case 17—is sequentially melted on the tire equatorial plane CL while the tire case 17 supported by the tire support portion 40 is rotated in the direction of arrow A (see FIG. 4) (in FIG. 9B, the dotted section represents the melted place of the tire case 17, and this dotted section is a first welded portion W1 of the present embodiment; the first welded portion W1 is bilaterally symmetrical across the tire equatorial plane CL).

In the present embodiment, the hot iron 47 having the rib 47A formed on its undersurface is pressed against the welded section, so the tire inner surface side of the melted section comes into close contact with the annular groove 72A and becomes a convex shape along the circumferential direction, and a concave portion is formed along the circumferential direction on the welded section surface on the tire outer surface side.

(5) Because of the rotation of the tire support portion 40, the melted section moves toward the rotational direction downstream side (the side in the direction of arrow A) and the concave portion on the tire outer surface side of the welded section is supplied (filled) with the molten welding-use thermoplastic material 43 extruded from the resin jetting nozzle 46. Because of this, the welding-use thermoplastic material 43 is welded to the surface of the first welded portion W1 (both one section of the one tire half 17A and one section of the other tire half 17A).

The "surface of the first welded portion" of the present invention means the surface on the tire outer surface side or the surface on the tire inner surface side of the first welded portion (in the present embodiment, the first welded portion W1) in which one tire constituent member (the one tire case 17 in the present embodiment) and another tire constituent member (the other tire case 17 in the present embodiment) are melted and welded. In the present embodiment, the surface on the tire outer surface side (the side to which the later-described tread rubber layer 30 is adhered) of the first welded portion W1 corresponds to the "surface of the first welded portion" of the present invention.

Figure 9C:
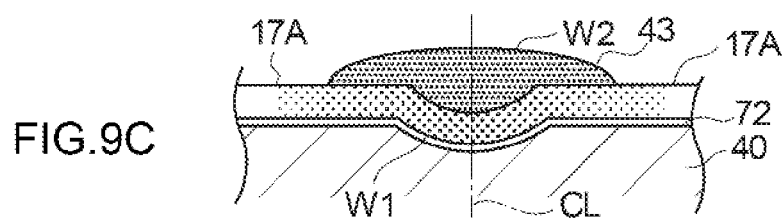
FIG. 9C is a cross-sectional view of the area around the joint section and shows the process for joining the tire halves.

Because of this, the melted section of the tire case 17 and the molten welding-use thermoplastic material 43 are welded, and in the welded section, the concave portion completely disappears and, as shown in FIG. 9C, a gentle convex portion is formed on the tire outer surface side by the molten welding-use thermoplastic material 43. The welded section of the welding-use thermoplastic material 43 becomes a second welded portion W2 of the present embodiment. The second welded portion W2 is bilaterally symmetrical across the tire equatorial plane CL. In FIG. 9, the welding-use thermoplastic material 43 indicated by the dots represents a molten state and the welding-use thermoplastic material 43 indicated by the diagonal lines represents a solidified state.

Figure 9D:
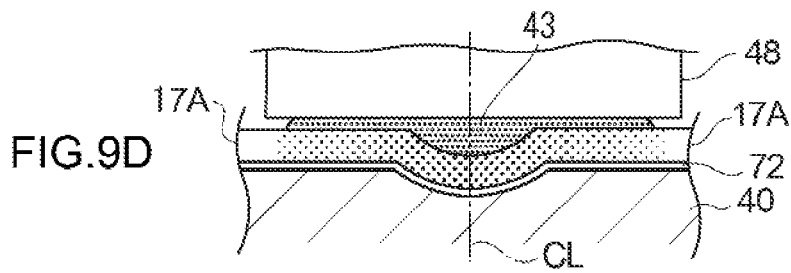
FIG. 9D is a cross-sectional view of the area around the joint section and shows the process for joining the tire halves.

(6) Thereafter, as shown in FIG. 9D, the welding-use thermoplastic material 43 in the molten state is sequentially pressed from outward to inward in the radial direction by the leveling roller 48 so that its surface is substantially flatly leveled.

In this way, in the tire manufacturing method of the present embodiment, the one tire half 17A and the other tire half 17A are completely welded such that their tire inner surface side has a convex shape and their tire outer surface side has a concave shape, and thereafter the welding-use thermoplastic material 43 in the molten state is supplied to and built up in the concave section of the welded section to thereby increase the thickness of the welded section, so a high joint strength is obtained and the welded section becomes more resistant particularly to bending deformation and tension.

Regarding the tire halves 17A before adhesion, it is preferred that the joint places be cleaned beforehand with a solvent such as alcohol. Furthermore, regarding the tire halves 17A before adhesion, a corona treatment or an ultraviolet treatment may also be performed on the joint places in order to make it easier for the welding-use thermoplastic material 43 to adhere thereto.

Figure 9E:
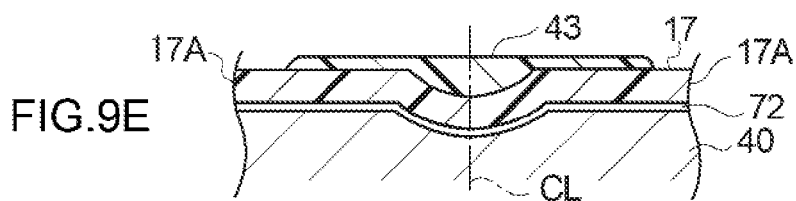
FIG. 9E is a cross-sectional view of the area around the joint section and shows the process for joining the tire halves.

Thereafter, as shown in FIG. 9E, the welding-use thermoplastic material 43 adhering to the tire halves 17A solidifies, the one tire half 17A and the other tire half 17A are strongly joined, and the tire case 17 in which the two tire halves 17A are completely integrated is obtained.

Figure 9F:
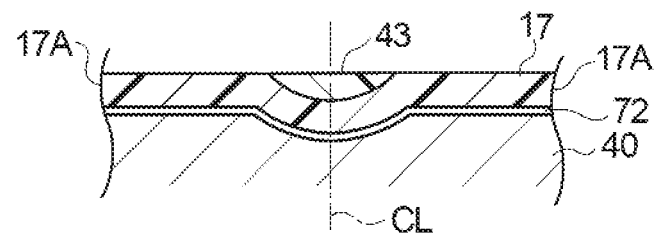
FIG. 9F is a cross-sectional view of the area around the joint section and shows the process for joining the tire halves.

As shown in FIG. 9F, the fill amount of the welding-use thermoplastic material 43 may also be adjusted so that the welding-use thermoplastic material 43 does not project, or the projecting surface of the welding-use thermoplastic material 43 may also be shaved off to make the surface of the welding-use thermoplastic material 43 even with the surface of the tire case 17.

In the present embodiment, the water-cooled leveling roller 48 is brought into contact with, and air for cooling blown from the cooling air blowing nozzle 45 is applied to, the welded section, whereby the welded section is rapidly cooled and solidified. The welded section can also be allowed to solidify by natural cooling, but there are cases where the welded section deforms or the like if it takes a long time to solidify.

Consequently, in order to suppress deformation or the like after welding, in the present embodiment, forced cooling of the welded section is performed using the water-cooled leveling roller 48 and the air for cooling blown from the cooling air blowing nozzle 45. Another water-cooled leveling roller 48 may also be disposed instead of the cooling air blowing nozzle 45.

(7) Next, the extruding machine 44 is moved away and the cord feeding device 56 is disposed in the neighborhood of the tire support portion 40.

As shown in FIG. 6, the tire case 17 is rotated in the direction of arrow A and the heated reinforcement cord 26 dispensed from the dispensing unit 70 of the cord feeding device 56 is spirally wound around the outer peripheral surface of the tire case 17 to form the crown portion reinforcement layer 28. In order to spirally wind the reinforcement cord 26 around the outer peripheral surface of the tire case 17, it suffices to move the cord feeding device 56 in the axial direction of the tire case 17 while rotating the tire case 17.

By heating the reinforcement cord 26 to a temperature higher than the melting point of the first thermoplastic material (e.g., bringing the temperature of the reinforcement cord 26 to about 100 to 200° C.), the section of the first thermoplastic material with which the reinforcement cord 26 comes into contact melts, so that part or all of the reinforcement cord 26 can be embedded in the outer peripheral surface of the tire case 17.

In the present embodiment, the reinforcement cord 26 is pressed by the first roller 60 and the second roller 64 and embedded inside the first thermoplastic material.

The embedded amount of the reinforcement cord 26 can be adjusted by the temperature of the reinforcement cord 26 and the tension acting on the reinforcement cord 26. The tension acting on the reinforcement cord 26 can be adjusted, for example, by applying a brake to the reel 58 or disposing a tension adjusting roller on the conveyance path of the reinforcement cord 26.

(8) Next, the vulcanized band-like tread rubber layer 30 is wound along the entire circumference around the outer peripheral surface of the tire case 17, and the tread rubber layer 30 is adhered to the outer peripheral surface of the tire case 17 using an adhesive or unvulcanized rubber (in the case of using unvulcanized rubber, vulcanization for adhering the tread rubber layer 30 is performed in a later step). As the tread rubber layer 30, for example, precured tread used in conventionally known remold tires can be used. This step is the same as the step of adhering a precured tread to the outer peripheral surface of a base tire of a remold tire.

As the adhesive, triazine thiol adhesives, chlorinated rubber adhesives, phenolic resin adhesives, isocyanate adhesives, and halogenated rubber adhesives, for example, can be used. In order to improve adhesive strength, it is preferred that the adhesive be dried to a certain extent after it has been applied. For this reason, it is preferred that the application of the adhesive be performed in an atmosphere whose humidity is equal to or less than 70%.

Furthermore, it is preferred that the place to which the tread rubber layer 30 is to be adhered be buffed beforehand to roughen its surface and cleaned with a solvent such as alcohol. Furthermore, regarding the tire halves 17A before the adhesion, a corona treatment or an ultraviolet treatment may also be performed on the joint place in order to make it easier for the welding-use thermoplastic material 43 to adhere to it.

(9) An adhesive or the like is used to adhere the seal layers 24 comprising vulcanized rubber to the bead portions 12 of the tire case 17, whereby the tire 10 shown in FIG. 1 becomes complete.

(10) Finally, the diameter of the tire support portion 40 is reduced, the completed tire 10 is removed from the tire support portion 40, and the tire inner surface support ring 72 inside the tire 10 is bendingly deformed and removed to the outside of the tire.

(Action)

Next, the action of the tire 10 of the present embodiment will be described.

In the tire 10 of the present embodiment, a high joint strength is obtained by welding the one tire half 17A and the other tire half 17A beforehand at the joint section of the tire halves 17A and then welding the welding-use thermoplastic material 43 to the welded section.

Figure 10A:
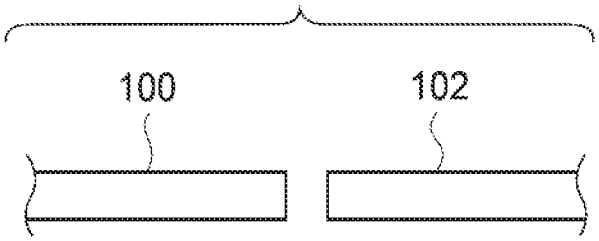
FIG. 10A is a cross-sectional view showing the joining of tire halves pertaining to a comparative example.
Figure 10B:
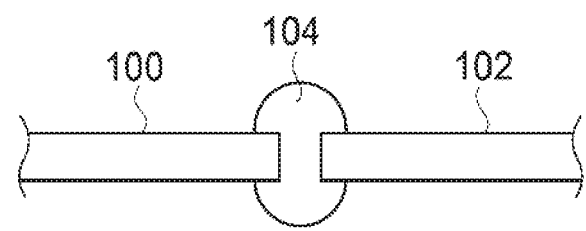
FIG. 10B is a cross-sectional view showing the joining of the tire halves pertaining to the comparative example.

By welding the molten welding-use thermoplastic material 43 to the melted first thermoplastic material, the affinity (compatibility) between the first thermoplastic material and the welding-use thermoplastic material 43 becomes higher, and a high joint strength is obtained between the first thermoplastic material and the welding-use thermoplastic material 43 in comparison to a case where the first thermoplastic material is not melted. For example, in a case where, as shown in FIG. 10A, an unmelted end portion of one member 100 and an unmelted end portion of another member 102 are disposed with an interval in between them and, as shown in FIG. 10B, a molten thermoplastic material 104 is adhered between the end portions and around the end portions and allowed to solidify, the corner sections of the end portions of the members remain inside the joint section, so in a case where a large stress acts thereon, the corner sections become a fracture center and it becomes easy for the joint section to fracture from the corner sections.

In the present embodiment, the end portions of the tire halves 17A are melted, but because the welding-use thermoplastic material 43 is adhered thereto and immediately cooled, deterioration of the first thermoplastic material is suppressed.

In the present embodiment, the tire halves 17A having the same shape are disposed face to face to form the tire case 17, so just one type of mold is needed to form the tire halves 17A. That is, the bilaterally symmetrical tire 10 can be manufactured without having to change the shape of the mold between the one tire half 17A and the other tire half 17A.

In the tire 10 of the present embodiment, substantially the entire tire 10 excluding the tread portion is formed of the first thermoplastic material, so the tire 10 can be formed by vacuum forming, pressure forming, or injection molding, for example, and the manufacturing process can be significantly simplified in comparison to that for a pneumatic tire made of rubber.

In the tire 10 of the present embodiment, the bead cores 18 are embedded in the bead portions 12, so fitting strength with respect to the rim 20 can be ensured like in a conventional pneumatic tire made of rubber.

In the tire 10 of the present embodiment, the percentage occupied by the first thermoplastic material in the tire constituent members is large, so the tire 10 has excellent recyclability.

By disposing, on the crown portion 16, the crown portion reinforcement layer 28 formed by spirally winding the reinforcement cord 26 whose stiffness is higher than that of the first thermoplastic material, the crown portion 16 is reinforced, and the puncture resistance, fracture resistance, circumferential direction stiffness, and anti-creep effect of the tire improve.

The seal layers 24 comprising rubber whose sealability (airtightness) is superior to that of the first thermoplastic material are disposed on the sections that contact the rim 20 and particularly the sections that contact the rim flanges 22, so the same sealability as in a conventional pneumatic tire made of rubber is obtained.

The tire 10 of the present embodiment is equipped with the tread rubber layer 30 comprising the same type of rubber as the rubber used in the tread of a conventional pneumatic tire made of rubber, so the same wear resistance and grip as in a conventional pneumatic tire made of rubber are obtained.

The tire case 17 of the present embodiment is formed by joining the two tire halves 17A, but in a case where the tire case 17 is configured from three members, the tire case 17 can be divided into three members: the one side portion 14, the other side portion 14, and the substantially cylindrical crown portion 16. When joining these also, they can be welded in the same way as in the present embodiment. It is preferred that the joint sections between the side portions 14 and the crown portion 16 be disposed in places that do not contact the road surface.

[Other Embodiments]

In the above embodiment, the end portions on the tire equatorial plane side of the tire halves 17A had sharply angled shapes, but the end portions may also have other shapes because they end up being melted by the hot iron 47 during welding.

In the above embodiment, the shape of the end portion of the one tire half 17A and the shape of the end portion of the other tire half 17A were bilaterally symmetrical across the tire equatorial plane CL, but depending on the case they may also be asymmetrical. The end portions of the tire halves 17A are not limited to the shapes described in the above embodiment and can be changed in a variety of ways.

In the above embodiment, the tread portion was formed by winding the vulcanized band-like tread rubber layer 30 along the entire circumference around the outer peripheral surface of the tire case 17, but as shown in FIG. 11, a vulcanized tread rubber layer 30 already formed in an annular shape beforehand can also be inserted from the axial direction over the tire case 17, and the tire case 17 and the vulcanized tread rubber layer 30 formed in an annular shape can be adhered to one another using an adhesive or the like.

In the above embodiment, the material of the reinforcement cord 26 was steel, but it may also be organic fiber or the like. In a case where the reinforcement cord 26 is organic fiber, the reinforcement cord 26 can be wound while heating and melting the outer surface of the outer peripheral portion of the tire case 17 without heating or while heating the reinforcement cord 26 itself, and heating the outer surface is preferred from the standpoint of joining.

Furthermore, in this case also, heating (blowing hot air, applying a hot roll, etc.) the joint surface before joining is preferred.

Forming the crown portion reinforcement layer 28 by spirally winding the reinforcement cord 26 is easy in terms of manufacturing, but the cord may also be discontinuous in the tire width direction.

In the above embodiment, the hot iron 47 having the shape shown in the drawings was used to melt the end portions of the tire halves 17A, but the shape of the hot iron 47 is not limited to the one in the above embodiment provided that it can melt the end portions of the tire halves 17A, and another member other than the hot iron 47 may also be used provided that it can melt the end portions of the tire halves 17A.

In the above embodiment, the welding-use thermoplastic material 43 was welded from the tire outer surface side with respect to the welded section of the one tire half 17A and the other tire half 17A, but it may also be welded from the tire inner surface side.

In the above embodiment, the tire case 17 was configured by combining the two tire halves 17A having the same shape, but the tire case 17 may also be configured by three or more tire constituent members having different shapes.

In the above embodiment, the positions of the first welded portion W1 and the second welded portion W2 were disposed on the tire equatorial plane CL, but depending on the shapes of the tire constituent members, the positions of the first welded portion W1 and the second welded portion W2 do not have to be on the tire equatorial plane CL.

The invention claimed is:

1. A tire comprising:
   one tire constituent member and another tire constituent member that are formed of a thermoplastic material, the one tire constituent member forming one side of the tire across the tire equatorial plane, and the other tire constituent member forming the other side of the tire across the tire equatorial plane;
   a first welded portion that is disposed on the tire equatorial plane and on a tire inner surface side formed by the one tire constituent member and the other tire constituent member, the tire inner surface side of the first welded portion, in which one section of the one tire constituent member and one section of the other tire constituent member are provided, being convex, and a tire outer surface side of the first welded portion being concave, the convex and concave shapes resulting from the welding of the first welded portion; and
   a second welded portion that is disposed on the tire equatorial plane and on the tire outer surface side, the second welded portion being formed by circumferentially extruding a welding-use thermoplastic material at the surface of the concave section of the first welded portion, and
   wherein the first welded portion and the second welded portion have bilaterally symmetrical shapes across the tire equatorial plane, respectively.

2. The tire according to claim 1, wherein the thermoplastic material forming the one tire constituent member and the other tire constituent member and the welding-use thermoplastic material are the same material.

3. The tire according to claim 1, wherein the tire constituent members have, on tire radial direction inner sides, bead portions that contact bead seats and rim flanges of a rim, and
   annular bead cores are embedded in the bead portions.

4. The tire according to claim 3, wherein the seal portions are disposed on the sections that contact the rim, the seal portions comprising a rubber whose sealability is superior to that of the thermoplastic material.

5. The tire according to claim 1, wherein a reinforcement layer formed by spirally winding a cord whose stiffness is higher than that of the thermoplastic material is disposed on the outer peripheral portion of the tire constituent members.

6. The tire according to claim 1, wherein a tread rubber layer comprising a rubber whose wear resistance is superior to that of the thermoplastic material is disposed on the tire constituent members on the section that contacts the road surface, and
   the tread rubber layer covers the first welded portion and the second welded portion.

* * * * *